(12) United States Patent
Richardson et al.

(10) Patent No.: US 10,308,492 B2
(45) Date of Patent: Jun. 4, 2019

(54) STABILIZER ARRANGEMENT

(71) Applicant: JLG Industries, Inc., McConnellsburg, PA (US)

(72) Inventors: Mark John Richardson, Wigston (GB); Brian Robert King, Wigston (GB)

(73) Assignee: JLG INDUSTRIES, INC., McConnellsburg, PA (US)

( * ) Notice: Subject to any disclaimer, the term of this patent is extended or adjusted under 35 U.S.C. 154(b) by 0 days.

(21) Appl. No.: 15/532,700

(22) PCT Filed: Nov. 27, 2015

(86) PCT No.: PCT/GB2015/053617
§ 371 (c)(1),
(2) Date: Jun. 2, 2017

(87) PCT Pub. No.: WO2016/087824
PCT Pub. Date: Jun. 9, 2016

(65) Prior Publication Data
US 2017/0341918 A1     Nov. 30, 2017

(30) Foreign Application Priority Data

Dec. 4, 2014    (GB) .................................. 1421571.9
Sep. 30, 2015   (GB) .................................. 1517285.1

(51) Int. Cl.
*B66F 17/00*       (2006.01)
*B66C 23/78*       (2006.01)
(Continued)

(52) U.S. Cl.
CPC ............ *B66F 17/006* (2013.01); *B66C 23/78* (2013.01); *B66F 9/07559* (2013.01);
(Continued)

(58) Field of Classification Search
CPC ...... B60S 9/02; B60S 9/04; B60S 9/10; E02F 9/085; B66F 17/006; B66F 9/07559; B66F 11/04; B66C 23/78
See application file for complete search history.

(56) References Cited

U.S. PATENT DOCUMENTS 2,570,334 A  *  10/1951  Erjavec .................... B60S 9/10
                                                     254/418
2,646,957 A  *   7/1953  Lovik ...................... B60S 9/02
                                                     248/346.03
(Continued)

FOREIGN PATENT DOCUMENTS

CN          2291402        9/1998
CN          201534755      7/2010
(Continued)

OTHER PUBLICATIONS

International Search Report dated Mar. 2, 2016 issued in PCT International Patent Application No. PCT/GB2015/053617, 7 pp.
(Continued)

*Primary Examiner* — Frank B Vanaman
(74) *Attorney, Agent, or Firm* — Nixon & Vanderhye P.C.

(57) ABSTRACT

A stabilizer arrangement for mobile apparatus such as an access platform having a chassis with a functional component movably mounted thereon for movement between a rest position and a use position, comprises a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, the stabilizer member and functional component being mechanically interconnected such that, in use, initial functional movement from the rest position of the functional (Continued)

component relative to the chassis causes movement of the stabilizer member from the retracted condition to the deployed condition.

14 Claims, 5 Drawing Sheets

(51) Int. Cl.
*B66F 9/075* (2006.01)
*B66F 11/04* (2006.01)
*B60S 9/04* (2006.01)
*E02F 9/08* (2006.01)

(52) U.S. Cl.
CPC .............. *B66F 11/04* (2013.01); *B60S 9/04* (2013.01); *E02F 9/085* (2013.01)

(56) References Cited

U.S. PATENT DOCUMENTS

| | | | | |
|---|---|---|---|---|
| 3,013,683 | A * | 12/1961 | Foster | B60S 9/04 |
| | | | | 280/475 |
| 3,144,138 | A * | 8/1964 | Brown | B60S 9/10 |
| | | | | 212/304 |
| 3,955,695 | A * | 5/1976 | Maurer | B60S 9/10 |
| | | | | 212/292 |
| 4,088,200 | A | 5/1978 | Cowley et al. | |
| 4,860,539 | A * | 8/1989 | Parrett | B66C 23/80 |
| | | | | 60/426 |
| 4,941,546 | A | 7/1990 | Nist et al. | |
| 5,335,891 | A | 8/1994 | Gibert | |
| 2010/0237692 | A1* | 9/2010 | Mlaker | B66C 23/78 |
| | | | | 307/9.1 |
| 2012/0211304 | A1 | 8/2012 | Rubey et al. | |
| 2014/0311825 | A1* | 10/2014 | Watson | B66F 11/04 |
| | | | | 182/63.1 |

FOREIGN PATENT DOCUMENTS

| | | |
|---|---|---|
| CN | 201801343 | 4/2011 |
| DE | 1063357 | 8/1959 |
| FR | 2537965 | 6/1984 |
| GB | 2 438 970 | 12/2007 |
| JP | 49-104314 | 10/1974 |
| JP | 50-55016 | 5/1975 |
| JP | 51-95317 | 8/1976 |
| JP | 53-43320 | 4/1978 |
| JP | 4-197998 | 7/1992 |
| JP | 5-229788 | 9/1993 |
| JP | 2000-344488 | 12/2000 |
| JP | 2011-168342 | 9/2011 |
| JP | 40-20090 | 7/2013 |
| KR | 20-0402817 | 12/2005 |
| SU | 305125 | 11/1970 |
| WO | WO 2009/141840 | 11/2009 |

OTHER PUBLICATIONS

Japanese Office Action dated Jul. 3, 2018 issued in Japanese Patent Application No. 2017-529705 and English translation, 8 pp.
Chinese Office Action dated Apr. 3, 2018 issued in Chinese Patent Application No. 201580066258.4 and English translation, 23 pp.
Russian Office Action dated Apr. 18, 2018 issued in Russian Patent Application No. 2017123334 and English translation, 13 pp.
Korean Office Action dated Oct. 10, 2018 issued in Korean Patent Application No. 10-2017-7016557 and English translation, 9 pp.

* cited by examiner

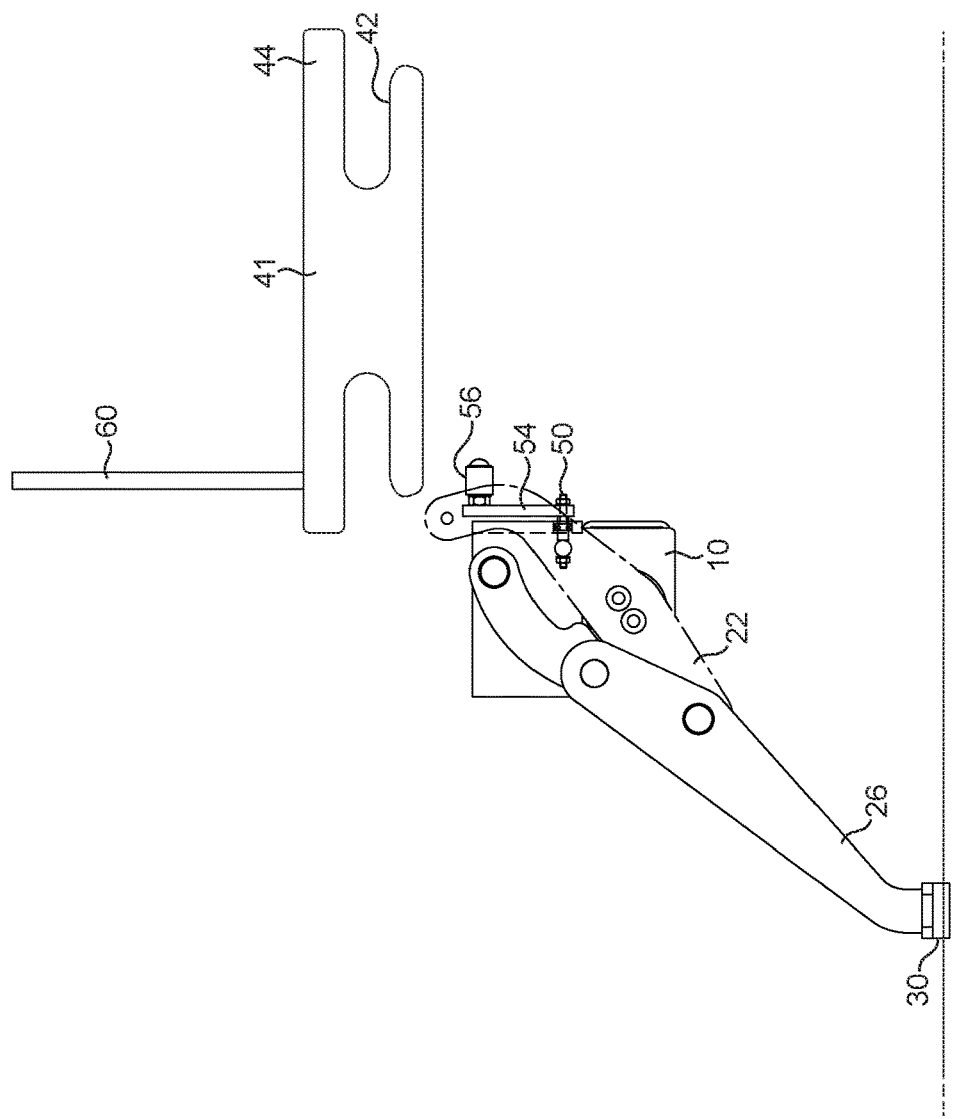
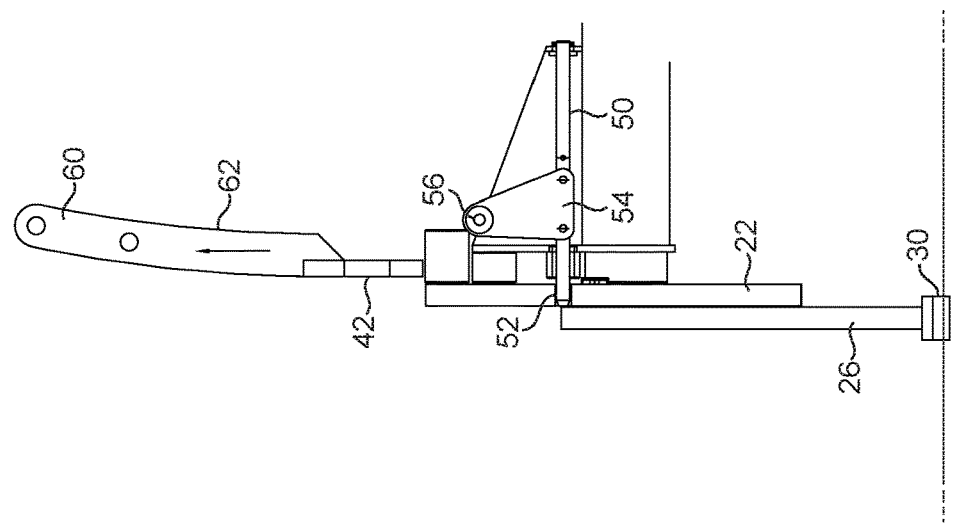

STABILIZER ARRANGEMENT

This application is the U.S. national phase of International Application No. PCT/GB2015/053617 filed Nov. 27, 2015 which designated the U.S. and claims priority to Great Britain Patent Application No. 1421571.9 filed Dec. 4, 2014 and Great Britain Patent Application No. 1517285.1 filed Sep. 30, 2015, the entire contents of each of which are hereby incorporated by reference.

FIELD OF THE INVENTION

This invention relates to stabilizer arrangements, and concerns a stabilizer arrangement for mobile apparatus.

BACKGROUND TO THE INVENTION

Many types of mobile apparatus such as access platforms with an elevating work platform, cranes etc rely on stabilizers (also known as outriggers) to provide and maintain stability during lifting operations, such as raising of a work platform. Known arrangements use stabilizers that are either manually set up or that rely on powered actuation, e.g. by hydraulic cylinders or linear actuators. In some situations, it is required to have a failsafe interlock system that prevents lifting operations unless the stabilizers are correctly deployed. In known arrangements, this is achieved by use of electrical sensors or switches which have a built in safely circuit or rely on positive mechanical action of the controlling contacts, or by use of a hydraulic shut off valve that is activated by a cam action as the stabilizer deploys.

The known arrangements are complex and costly, and the present invention aims to provide a simpler alternative.

SUMMARY OF THE INVENTION

In one aspect, the present invention provides a stabilizer arrangement for mobile apparatus having a chassis with a functional component movably mounted thereon for movement between a rest position and a use position, comprising a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, the stabilizer member and functional component being mechanically interconnected such that, in use, initial functional movement from the rest position of the functional component relative to the chassis causes movement of the stabilizer member from the retracted condition to the deployed condition.

The invention thus provides a mechanical arrangement that functions automatically to deploy the stabilizer on initial functional movement of the functional component, without requiring operator intervention, and not employing powered actuators. The arrangement is thus simple to use and can be constructed and maintained cheaply.

The invention is applicable to mobile apparatus such as mobile access platforms and towers, mobile cranes etc. that typically have an elevating component such as a work platform, boom etc. that is elevated in use with respect to the chassis (and the ground) in a manner involving movement of the functional component with respect to the chassis from the rest position to the use position. The functional component typically comprises an elevating mast, e.g. a telescopic mast, arranged for linear movement with respect to the chassis or an elevating boom arranged for pivoting movement with respect to the chassis from a lowered, rest position to an elevated, use position, with the work platform or other elevating component mounted (directly or indirectly) thereon. The mobile apparatus typically has ground-engaging wheels mounted on the chassis, to facilitate movement of the apparatus, and may be self-propelled or otherwise.

The invention is particularly applicable to apparatus intended to be used on relatively hard, level surfaces, where it is generally sufficient simply to provide stabilizing contact with the ground, rather than raising or levelling the apparatus with respect to the ground.

References to "deployed condition" of the stabilizer member mean that the member is fully deployed, with the ground-engaging portion, thereof engaging the ground (and so providing a stabilizing function). If the member is partially deployed (i.e. partially retracted) so that the ground-engaging portion does not engage the ground, this does not constitute a "deployed condition".

The mechanical interconnection between the stabilizer member and the functional component is preferably such that further functional movement of the functional component, after the initial movement from the rest position, is only possible when the stabilizer arrangement is in the deployed condition. Thus, the stabilizer arrangement preferably includes a mechanical interlock that prevents further functional movement of the functional component until the stabilizer arrangement is in the deployed condition (i.e. fully deployed).

The stabilizer arrangement preferably comprises an interlock member pivotally mounted with respect to the chassis, typically for pivoting about an axis that is parallel to the ground in use of the apparatus. The interlock member includes a portion that cooperates with the functional component, and is movable between a locking position in which only initial functional movement of the functional component is possible, and a release position in which further movement of the functional component is possible. Thus, the interlock member is releasably interconnected with the functional component. The interlock member also includes a portion that cooperates with or constitutes the stabilizer member, being moved into the release position on movement of the stabilizer member to the deployed condition and being returned to the locking position on reverse movement of the functional component. The interlock member is conveniently of elongate form. The pivotal mounting of the interlock member with respect to the chassis is suitably between the two portions.

The interlock member may, for example, cooperate with a stop member mounted on the functional component, being positioned in the path of movement of the stop when the stabilizer member is in the retracted condition, thus limiting movement of the functional component, but being moved out of this path when the stabilizer member is in the deployed condition, thus permitting further movement of the functional component. The interlock member is moved back into the path of the stop member by reverse movement of the functional component, reactivating the interlock.

As a further possibility, the interlock member may cooperate with the functional component by means of a guide arrangement comprising a guide portion, such as a guide track or guide slot, and a guide member, such as a guide roller. For example, the relevant portion of the interlock member may comprise a guide member that is slidingly received in a guide portion in the functional component. The position and dimensions of the guide portion constrain possible movement of the guide member and hence the interlock member, with the arrangement being configured such that the guide member is retained within the guide portion (and thus movement of the functional component is restricted) until the stabilizer member is in the deployed condition, at which point the guide member is released from the guide portion, thus enabling further movement of the functional component.

In one preferred embodiment, a guide slot is provided in the functional component, typically at or near the lower end thereof, that cooperates with a portion of the interlock member, e.g. a guide roller mounted at or near one end thereof. The guide slot is preferably assymetrical, having an overhanging upper wall that engages the guide roller on reverse movement of the functional component and guides the guide roller into the guide slot to return the interlock member to the locking position.

The invention can thus provide a simple mechanical interlock that prevents movement of the function component beyond the initial movement unless the stabilizer arrangement is in the deployed condition, with the interlock being automatically reactivated on reverse movement of the functional component.

The stabilizer member and functional component are conveniently connected by means of a link member that is pivotally mounted with respect to the chassis, typically for pivoting about an axis that is parallel to the ground in use of the apparatus. Initial functional movement of the functional component from the rest position causes pivoting movement of the link member with respect to the chassis, which in turn causes movement of the stabilizer member from the retracted condition to the deployed condition. A portion of the link member cooperates with the functional component and a portion of the link member cooperates with the stabilizer member. Movement of the functional component in the reverse direction causes pivoting movement of the link member in the opposite sense, moving the stabilizer member back to the retracted condition.

In a simple case, the link member comprises a rotary shaft arranged to rotate with respect to the chassis about a longitudinal axis that is generally parallel to the ground in use. Rotation of the shaft is caused by initial functional movement of the functional component, e.g. via a rack and pinion arrangement, via a cam action, via gears etc., with movement of the functional component in the reverse direction causing rotation of the shaft member in the opposite sense. A finger and pawl arrangement or similar mechanism may be used to constrain movement of the shaft and prevent undesired rotation in an inappropriate direction, with the arrangement being released at the appropriate time, e.g. by means of a protrusion on the functional member displacing the finger.

One or more stabilizer members may be fixed in rotation to the shaft, to be rotated from the retracted condition to the deployed condition. As a further possibility, rotation of the shaft may cause linear movement of one or more stabilizer members from the retracted condition to the deployed condition, e.g. via a rack and pinion arrangement.

The stabilizer member is preferably pivotally mounted with respect to the chassis, either directly or indirectly via one or more intervening components, typically for pivoting about an axis that is parallel to the ground in use of the apparatus.

Preferably the link member (which is pivotally mounted with respect to the chassis) is also pivotally connected with respect to the stabilizer member. This arrangement provides for indirect pivotal mounting of the stabilizer member with respect to the chassis. On initial functional movement of the functional component, the link member pivots with respect to the chassis, and the stabilizer member pivots with respect to the link member, moving from the retracted condition to the deployed condition.

The link member in this case conveniently comprises a link arm of elongate form.

The pivotal mounting of the link member, e.g. link arm, with respect to the chassis is conveniently located between the portion of the link member that cooperates with the functional component and the portion that cooperates with the stabilizer member.

The stabilizer arrangement preferably further includes a link component pivotally mounted with respect to the chassis and also pivotally mounted with respect to the stabilizer member, with both pivotal mountings preferably being for pivoting about an axis that is parallel to the ground in use of the apparatus. This functions to drive pivoting movement of the stabilizer member relative to the link member on movement of the link member. The pivotal mounting of the link member with respect to the stabilizer member is preferably located between the ground-engaging portion of the stabilizer member and the mounting of the link component. The arrangement is preferably such as to provide for overcentre locking of the stabilizer member in the deployed condition.

The stabilizer arrangement conveniently includes a locking mechanism that acts to prevent pivotal movement of the interlock member and/or the link member when the stabilizer arrangement is in deployed condition. This acts as an additional safety feature, preventing possible inadvertent movement of these components. The locking mechanism may comprise a locking member (.e.g a lock pin) fixed with respect to the chassis for removable engagement with a co-operating locking element (e.g. a lock pin location hole or recess) fixed with respect to the interlock member and/or link member as appropriate. The locking member may be urged into engagement with the locking element, e.g. by a spring bias arrangement (such as a spring-loaded lock pin) with an associated cam arrangement, such as a cam surface fixed with respect to the functional component and a cam member (e.g. cam roller) fixed with respect to the locking member, the cam arrangement functioning to withdraw the locking member from engagement with the locking element on movement of the functional component from the use position.

In embodiments in which the link member is pivotally connected with respect to the stabilizer member, the link member may also function as the interlock member, as discussed above, functioning both as in interlock mechanism and to move the stabilizer member.

Thus, a preferred arrangement comprises a link/interlock member pivotally mounted with respect to the chassis, the link/interlock member also being pivotally connected with respect to the stabilizer member, wherein the link/interlock member includes a portion that cooperates with the functional component, being movable between a locking position in which only initial functional movement of the functional component is possible and a release position in which further movement of the functional component is possible.

Further features of the link/interlock member are as discussed above in connection with the interlock member.

In preferred embodiments, the link/interlock member and the functional component cooperate by means of a guide arrangement as discussed above.

In a further aspect, the present invention provides a stabilizer arrangement for mobile apparatus having a chassis with a functional component movably mounted thereon for movement between a rest position and a use position, comprising a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, a link member pivotally mounted with respect to the chassis, the stabilizer member being pivotally mounted with respect to the link member, the link member and functional component being mechanically interconnected such that, in use, initial functional movement from the rest position of the functional component relative to the chassis causes movement of the link member that acts to move the stabilizer member from the retracted condition to the deployed condition.

Preferably the arrangement is such that further functional of movement of the functional component is only possible when the stabilizer arrangement is in the deployed condition. The link member may also function as an interlock member in this case.

In a further aspect, the present invention provides mobile apparatus, particularly an access tower, comprising one or more stabilizer arrangements in accordance with the present invention.

Typically the apparatus will comprise at least two stabilizer arrangements. For instance four stabilizer arrangements may be provided, one at each corner of apparatus with a generally rectangular footprint, or two stabilizer arrangements at one end of such apparatus.

The stabilizer arrangements may be the same or different.

In use of the apparatus, it will generally be necessary for all of the stabilizer arrangements to be in deployed condition before the functional component can be moved beyond the initial movement.

BRIEF DESCRIPTION OF THE DRAWINGS

A preferred embodiment of the invention in the form of a mobile access tower with an elevating platform having four stabilizer arrangements will now be described, by way of illustration, with reference to the accompanying drawings, in which:

FIG. 14 is a view similar to FIG. 12 with the stabilizer arrangement deployed; and FIG. 15 is a view similar to FIG. 13 with the stabilizer arrangement deployed.

DETAILED DESCRIPTION OF THE DRAWINGS

Figure 1:
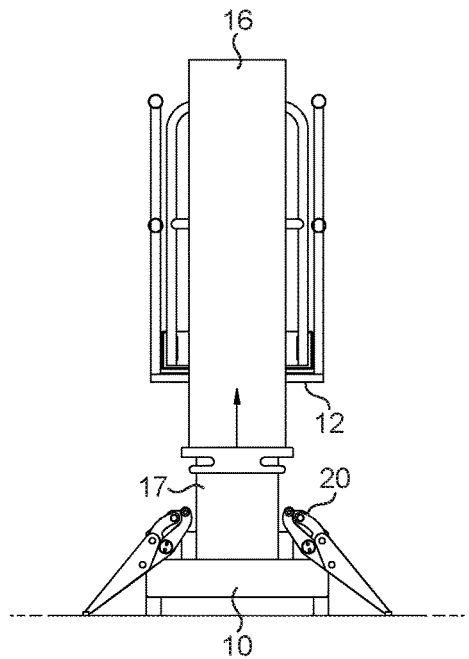
FIG. 1 is a schematic rear view of the tower with the stabilizer arrangements deployed and the platform partly elevated.
Figure 2:
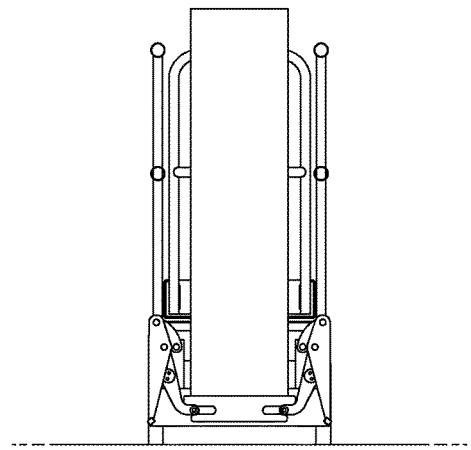
FIG. 2 is a view similar to FIG. 1 with the stabilizer arrangements retracted and the platform lowered.

The illustrated apparatus comprises a mobile access tower that has a generally rectangular footprint, having a chassis 10 with an elevating work platform 12 with guard rails 14 mounted on a telescopic post 16 constituting a functional component of the tower. The post 16 can be raised and lowered with respect to a vertically extending mount 17 fixed with respect to the chassis 10, by a mechanism (not shown). The chassis has four ground-engaging wheels 18, one at each corner, and is not self-propelled. The tower is intended for use on relatively hard, level surfaces, e.g. indoors.

Four similar stabilizers arrangements 20 (also referred to as stabilizers for brevity) are provided, one at each corner of the chassis 10.

Figure 5:
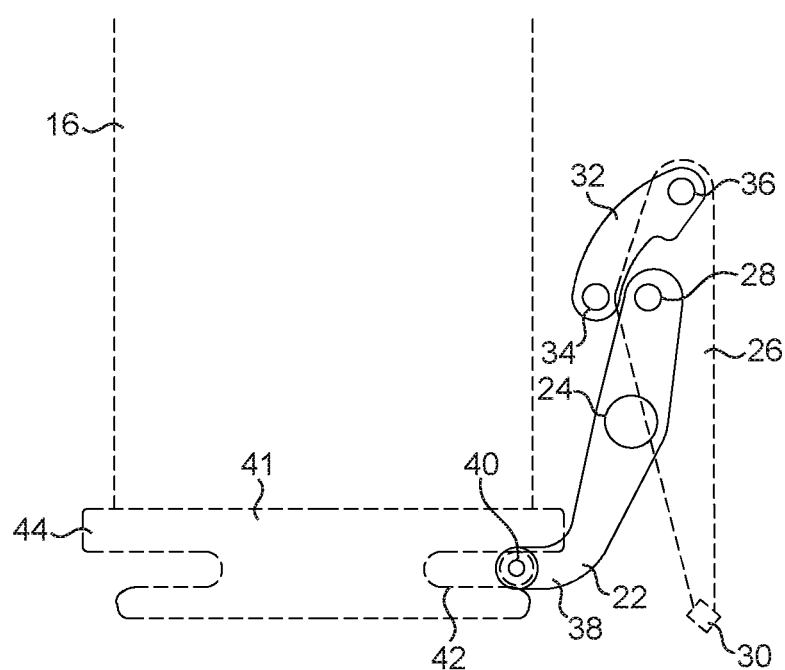
FIG. 5 is an enlarged scale view of part of FIG. 2.
Figure 6:
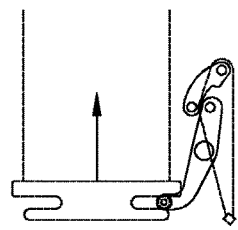
FIG. 6 is a schematic rear view of part of FIG. 2 showing one of a sequence of different positions.

Referring particularly to FIG. 5, each stabilizer 20 at the rear of the tower comprises an elongate link arm 22 that constitutes a link/interlock member pivotally mounted in a central region thereof on pivot tube 24 that is mounted on the chassis 10 for rotation about a longitudinal axis (parallel to the ground in use) with respect to the chassis 10. An elongate stabilizer arm 26 (shown in dashed lines in FIG. 5) that constitutes a stabilizer member is pivotally mounted in a central region thereof at 28 to the link arm 22 adjacent one end of the link arm 22 for pivoting about an axis that is parallel to the longitudinal axis of the pivot tube 24. A ground-engaging portion 30 is provided at one end of the arm 26. An elongate link component 32 is pivotally mounted with respect to the chassis 10 at 34 adjacent one end of component 32, with the link component 32 being pivotally secured to the stabilizer arm 26 at 36 adjacent the other end of the link component 32. Both pivotal mountings 34 and 36 are oriented for pivoting about an axis that is parallel to the longitudinal axis of the pivot tube 24.

The link component 32 provides two functions, one is to act as an overcentre lock for when the stabilizer is deployed, as discussed below, and the other is to change the movement of the stabilizer arm 26 from a rotation from vertical to deployed (where the arm would swing down on a pivot about the driveshaft), to one where the arm swings out and down (parallel linkage/link arm). This reduces the likelihood of a rotating arm catching a wall or other similar obstruction when being deployed, thereby damaging the wall or obstruction.

The link arm 22 includes an angled end portion 38 at the end remote from the end to which the stabilizer arm 26 is pivotally mounted at 28, with a guide roller 40 fixed to portion 38.

The lower end of the telescopic post 16 is provided with a stabilizer actuator plate 41 with a guide profile in the form of a guide slot 42 in which the link arm guide roller 40 is slidingly received. The slot 42 is assymetic, having an overhanging upper wall 44.

Figure 3:
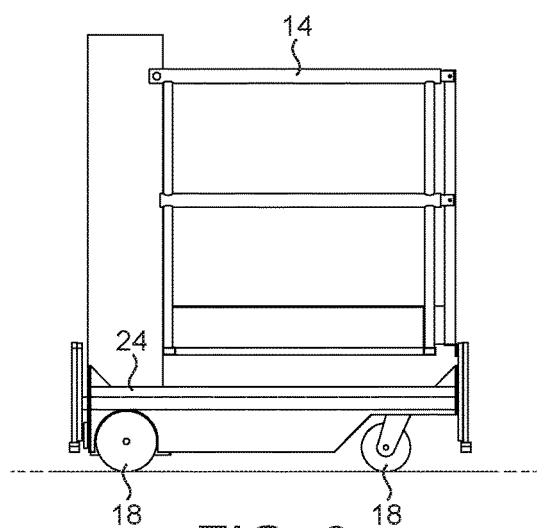
FIG. 3 is a schematic side view of the arrangement shown in FIG. 2.
Figure 4:
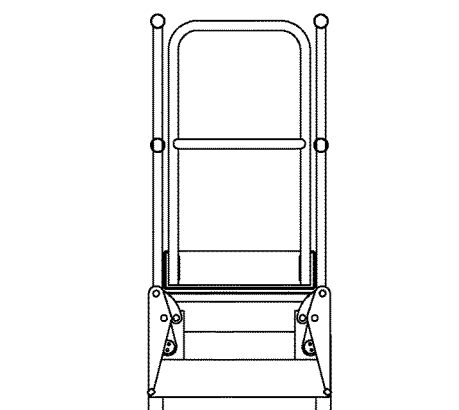
FIG. 4 is a schematic front view of the arrangement shown in FIGS. 2 and 3.

Each stabilizer 20 at the front of the tower is of similar construction to the rear stabilizers as described above, but does not interact directly with the telescopic post 16. Instead there is an indirect connection via pivot tube 24. As shown in FIG. 3, the pivot tube 24 links the front and rear stabilizers at one side of the tower, so that movement of the rear stabilizer causes corresponding movement of the associated front stabilizer. There is a similar arrangement at the other side of the tower.

The stabilizer arrangement is movable between a retracted condition, as shown in FIGS. 2, 3, 4, 5 and 6, to a deployed condition, as shown in FIGS. 1, 10, 11 and 12, in which the ground-engaging portion 30 contacts the ground 46 to stabilize the tower, without raising the tower off the ground, so that the wheels 18 are still in contact with the ground.

In use, with the telescopic post 16 (and the platform 14) fully lowered and with the stabilizers 20 in retracted condition, the tower is moved to a desired location for use. In this condition it is not possible to raise the post 16 and platform 14 without simultaneously deploying the stabilizers 20, as will be described.

Figure 7:
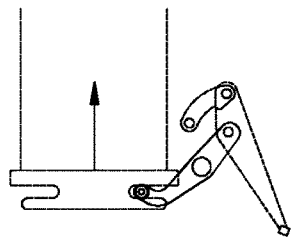
FIG. 7 is a schematic rear view of part of FIG. 2 showing one of a sequence of different positions.
Figure 8:
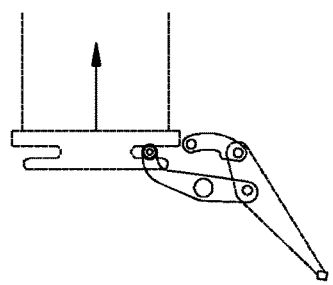
FIG. 8 is a schematic rear view of part of FIG. 2 showing one of a sequence of different positions.

On initial functional movement of the telescopic post 16, in an upwards direction to elevate the platform 14 with respect to chassis 10, the guide roller 40 at the end of the link arm 20 traverses the guide slot 42 in an inwards direction, causing the link arm 20 (and attached pivot tube 24) to pivot with respect to the chassis 10 in a clockwise direction as seen in FIG. 5, causing the stabilizer arm 26 to pivot in an anti-clockwise direction, being driven by clockwise pivoting of the link component 32. This action forces the stabilizer arm 26 to move downwardly and outwardly, as illustrated in FIG. 7. This motion continues as the post 16 elevates further, as shown in FIG. 8.

Figure 9:
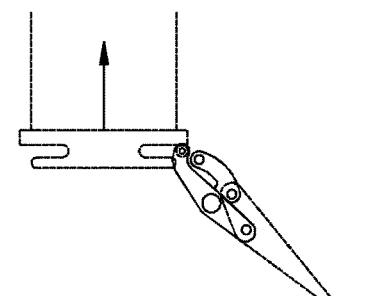
FIG. 9 is a schematic rear view of part of FIG. 2 showing one of a sequence of different positions.

After a certain vertical distance of travel, the stabilizer arm is moved to the fully deployed condition, as shown in FIG. 9, with portion 30 in contact with the ground 46. The linkage is locked in this position by an overcentre arrangement of link component 32, as shown in FIG. 9. The stabilizer provides a stabilizing function, by contact with the ground, without raising the chassis with respect to the ground.

Figure 10:
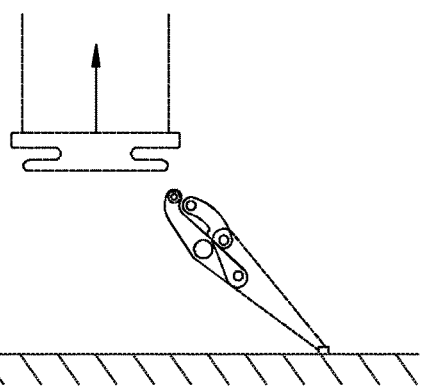
FIG. 10 is a schematic rear view of part of FIG. 2 showing one of a sequence of different positions.

The guide slot 42 is configured and dimensioned so that when the stabilizer arrangement is fully deployed, the guide roller 40 is released from engagement with the lower, shorter wall of the slot 42, so that the post 16 (and platform 14) are free to elevate further as shown in FIG. 10. In this condition, the link arm 22 (which performs an interlock function) is in a release position.

However, if the stabilizer arm hits an obstruction when the post 16 is initially elevating, or is otherwise prevented from being moved to the fully deployed condition, the travel of the link arm will be restricted and the guide roller will remain in the slot 42, thus preventing further lifting of the post 16. That is, the link arm 22 remains in a locking position for the interlock function. This thus provides an automatic interlock function.

This action all takes place automatically in a fully mechanical manner on raising of the post 16, by means of the mechanical linkage, without requiring any operator intervention.

Figure 11:
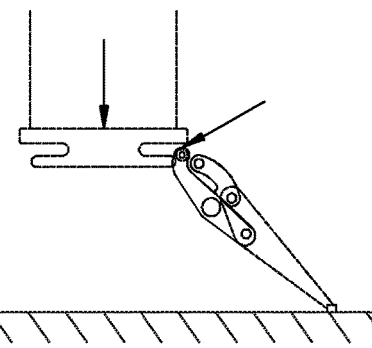
FIG. 11 is a schematic rear view of part of FIG. 2 showing one of a sequence of different positions.

On subsequently lowering of the post 16, the overhanging upper wall 44 of the slot 42 of the post 14 engages the link arm guide roller 40, as shown in FIG. 11, with continued downwards movement guiding the roller into the slot and causing reverse movement of the link arm 22 and associated components to return the stabilizer arrangement to the retracted condition in an automatic manner, not requiring operator intervention.

In a typical embodiment, the access tower has an overall length of 1650 mm, an overall height (with the platform fully lowered) of 1800 mm, and an overall width of 750 mm with the stabilizers retracted and 1271 mm with the stabilizers deployed. The length of the stabilizer arm 26 from pivot point 36 to portion 30 is 423 mm. With the stabilizers in retracted condition, the distance from the top of the stabilizer arm 26 to the ground is 531 mm.

The components of the stabilizer arrangement are of steel.

The modified arrangement illustrated in FIGS. 12 to 15 additionally includes a locking pin arrangement to prevent accidental movement of the link arm 22 when the stabilizer arrangement is in the deployed condition. Other components of the modified arrangement correspond to those of the embodiment of FIGS. 1 to 11 and are indicated by the same reference numbers.

In the modified arrangement, a spring-loaded lock pin 50, extending along an axis parallel to that of pivot tube 24 and pivotal mountings 34 and 36, is mounted on the chassis 10, being urged by a constant spring force in a direction towards the associated link arm 22. The lock pin 50 co-operates with a lock pin location hole in the link arm 22.

A cam plate 54 with cam roller 56 is fixed to the pin 50 and co-operates with a cam arm 60 having a cam surface 62 secured with respect to the stabilizer activator plate 41.

Figure 12:
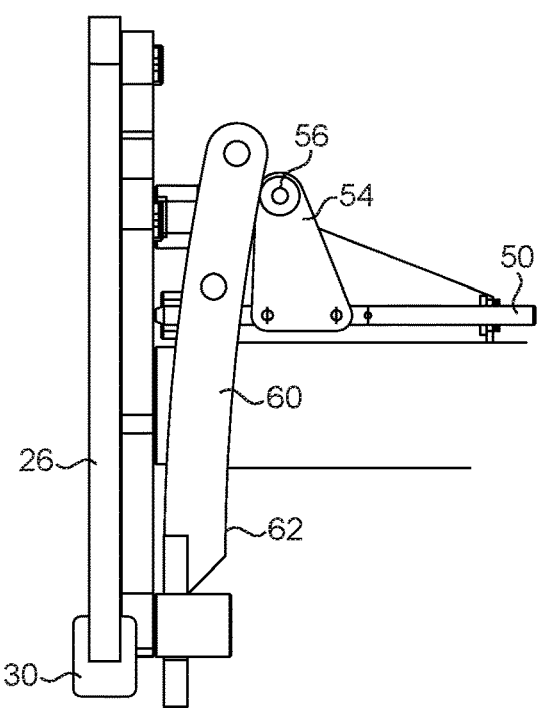
FIG. 12 is a schematic side view of part of a modified version of a stabilizer arrangement as shown in FIGS. 1 to 11, with the stabilizer arrangement retracted.
Figure 13:
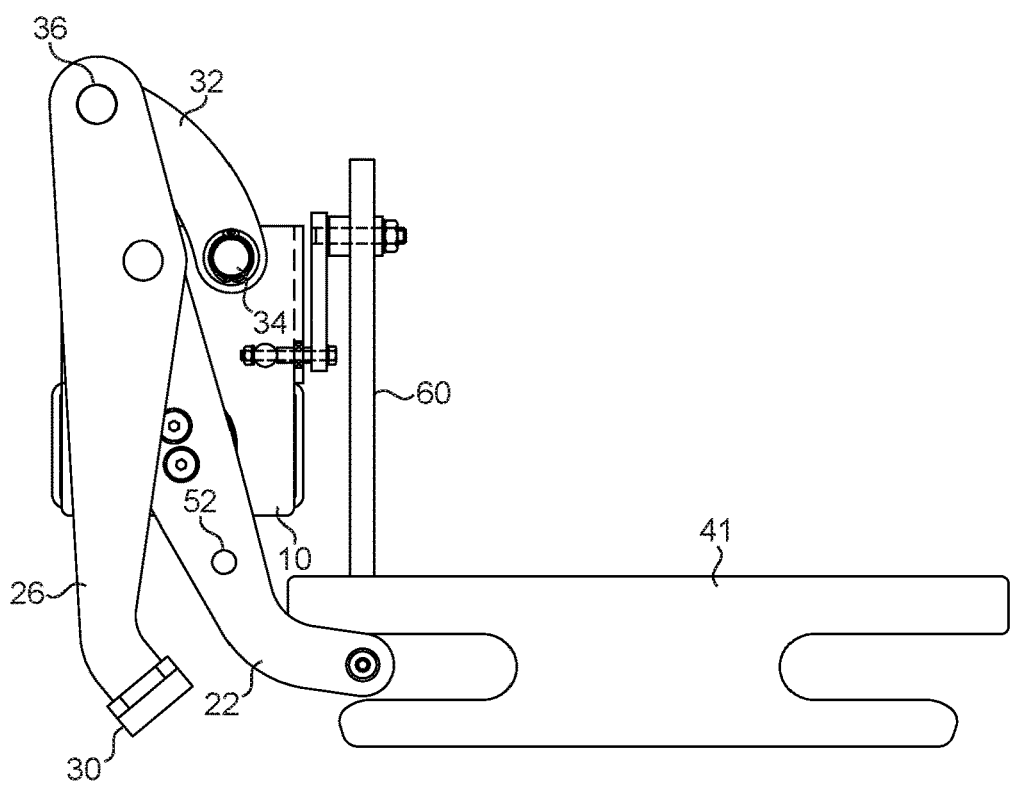
FIG. 13 is a schematic rear view of the modified arrangement shown in FIG. 12, with the stabilizer arrangement retracted.

When the platform and activator plate 41 are fully lowered and the stabilizer arrangement is in the retracted condition, as shown in FIGS. 12 and 13, the cam surface 62 engages the cam roller 56 and maintains the pin 50 in a retracted condition, free from the location hole 52.

On functional movement of post 16 to elevate platform 14 (with the stabilizer activator plate 41 and cam arm 60) with respect to the chassis 10, the stabilizer arrangement functions as described above, moving to the deployed condition. The cam arm 60 moves upwardly along with the plate 41, and the cam surface 62 moves out of engagement on the cam roller 62 so that the lock pin 50 is no longer retained in the retracted condition but moves under the spring force towards the link arm 22 (to the left as seen in FIG. 14) so that the pin 50 engages in the hole 52 in the link arm 22, as shown in FIGS. 14 and 15. Engagement of the pin 50 in hole 52 prevents any possible pivoting movement of the link arm 22 about pivot tube 24 when the stabilizer arrangement is in the deployed condition, thus providing a further safety feature.

On subsequent lowering of the platform, the cam arm is lowered with the stabilizer activator plate 41 and the cam surface 62 is brought into engagement with the roller 56, withdrawing the pin 50 from hole 62 against the spring force, freeing the stabilizer link arm 22 for pivoting and thus enabling the stabilizer arrangement to be returned to the retracted condition, as described previously.

The invention claimed is:

1. A stabilizer arrangement for mobile apparatus having a chassis with a functional component movably mounted thereon for movement between a rest position and a use position, comprising a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, the functional component including a guide slot, and an interlock member including a guide member engaging the guide slot in the retracted condition, the stabilizer member and functional component being mechanically interconnected through the interlock member by the guide member in the guide slot such that, in use, initial functional movement from the rest position of the functional component relative to the chassis causes movement of the stabilizer member from the retracted condition to the deployed condition, wherein the interlock member is pivotally mounted with respect to the chassis, the interlock member also being pivotally connected with respect to the stabilizer member, wherein the interlock member includes a portion that cooperates with the functional component, being movable between a locking position in which only initial functional movement of the functional component is possible and a release position in which further movement of the functional component is possible.

2. A stabilizer arrangement according to claim 1, wherein the mechanical interconnection between the stabilizer member and the functional component by the guide member in the guide slot is such that further functional movement of the functional component, after the initial movement from the rest position, is only possible when the stabilizer member is in the deployed condition.

3. A stabilizer arrangement according to claim 1, wherein the interlock member includes a portion that cooperates with or constitutes the stabilizer member, being moved into the release position on movement of the stabilizer member to the deployed condition and being returned to the locking position on reverse movement of the functional component.

4. A stabilizer arrangement according to claim 3, wherein the pivotal mounting of the interlock member with respect to the chassis is between the two portions.

5. A stabilizer arrangement according to claim 1, wherein the guide member comprises a guide roller mounted on the interlock member.

6. A stabilizer arrangement according to claim 1, further comprising a locking mechanism that functions to prevent pivotal movement of the interlock member when the stabilizer member is in the deployed condition.

7. A stabilizer arrangement according to claim 1, wherein the interlock member is pivotally connected with respect to the stabilizer member.

8. A stabilizer arrangement according to claim 7, wherein the interlock member comprises a link arm of elongate form.

9. A stabilizer arrangement according to claim 7, wherein the pivotal mounting of the interlock member with respect to the chassis is located between a portion of the interlock member that cooperates with the functional component and a portion of the interlock member that cooperates with the stabilizer member.

10. A stabilizer arrangement according to claim 7, further comprising a link component pivotally mounted with respect to the chassis and also pivotally mounted with respect to the stabilizer member.

11. A stabilizer arrangement according to claim 10, wherein the pivotal mounting of the interlock member with respect to the stabilizer member is located between the ground-engaging portion of the stabilizer member and the mounting of the link component.

12. A stabilizer arrangement according to claim 7, further comprising a locking mechanism that functions to prevent pivotal movement of the interlock member when the stabilizer member is in the deployed condition.

13. A stabilizer arrangement for mobile apparatus having a chassis with a functional component movably mounted thereon for movement between a rest position and a use position, comprising a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, the functional component including a guide slot, and an interlock member including a guide member engaging the guide slot in the retracted condition, the stabilizer member and functional component being mechanically interconnected through the interlock member by the guide member in the guide slot such that, in use, initial functional movement from the rest position of the functional component relative to the chassis causes movement of the stabilizer member from the retracted condition to the deployed condition, wherein the guide member comprises a guide roller mounted on the interlock member, and wherein the guide slot is asymmetrical, having an overhanging upper wall that engages the guide roller on reverse movement of the functional component and guides the guide roller into the guide slot to return the interlock member to the locking position.

14. A stabilizer arrangement for mobile apparatus having a chassis with a functional component movably mounted thereon for movement between a rest position and a use position, comprising a stabilizer member movably mounted with respect to the chassis and having a ground-engaging portion, the stabilizer member being movable between a retracted condition in which the ground-engaging portion does not engage the ground and a deployed condition in which the ground-engaging portion engages the ground, the stabilizer member and functional component being mechanically interconnected such that, in use, initial functional movement from the rest position of the functional component relative to the chassis causes movement of the stabilizer member from the retracted condition to the deployed condition, wherein the stabilizer member and functional component are connected by means of a link member that is pivotally mounted with respect to the chassis, the stabilizer arrangement further comprising a link component pivotally mounted with respect to the chassis and also pivotally mounted with respect to the stabilizer member, wherein the pivotal mounting of the link member with respect to the stabilizer member is located between the ground-engaging portion of the stabilizer member and the mounting of the link component, wherein the link component is arranged to provide for overcentre locking of the stabilizer member in the deployed condition.

* * * * *